(12) United States Patent
Bennington (10) Patent No.: US 10,830,070 B2
(45) Date of Patent: Nov. 10, 2020

(54) ENDWALL COUNTOURING TRENCH

(71) Applicant: UNITED TECHNOLOGIES CORPORATION, Hartford, CT (US)

(72) Inventor: Matthew A. Bennington, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1083 days.

(21) Appl. No.: 15/027,562

(22) PCT Filed: Oct. 21, 2014

(86) PCT No.: PCT/US2014/061449
§ 371 (c)(1),
(2) Date: Apr. 6, 2016

(87) PCT Pub. No.: WO2015/076961
PCT Pub. Date: May 28, 2015

(65) Prior Publication Data
US 2016/0237837 A1   Aug. 18, 2016

Related U.S. Application Data

(60) Provisional application No. 61/907,420, filed on Nov. 22, 2013.

(51) Int. Cl.
*F01D 9/04*     (2006.01)
*F01D 5/14*     (2006.01)
(Continued)

(52) U.S. Cl.
CPC ............. *F01D 9/041* (2013.01); *F01D 5/143* (2013.01); *F01D 5/145* (2013.01); *F01D 25/246* (2013.01);
(Continued)

(58) Field of Classification Search
CPC .......... F01D 9/041; F01D 5/141; F01D 5/143; F01D 5/145; F01D 5/186; F01D 5/187;
(Continued)

(56) References Cited

U.S. PATENT DOCUMENTS 6,183,197 B1 * 2/2001 Bunker ................... F01D 5/141
                                                            415/178
6,619,916 B1     9/2003 Capozzi et al.
(Continued)

FOREIGN PATENT DOCUMENTS

EP     2589752 A2    5/2013

OTHER PUBLICATIONS

Supplementary European Search Report for European Application No. 14863858.8 dated Jan. 2, 2018.
(Continued)

*Primary Examiner* — Jesse S Bogue
*Assistant Examiner* — Loren C Edwards
(74) *Attorney, Agent, or Firm* — Carlson, Gaskey & Olds, P.C.

(57) ABSTRACT

A gas turbine engine component comprises a casing, and a component fixed to the casing to extend from a first edge to a second edge. The component has a first side and a second side. A trench is formed within the casing adjacent the second side of the component. The trench has a maximum depth that is positioned at or aft of the first edge.

21 Claims, 5 Drawing Sheets

(51) Int. Cl.
*F01D 25/24* (2006.01)
*F02C 3/04* (2006.01)

(52) U.S. Cl.
CPC ............ *F02C 3/04* (2013.01); *F05D 2220/32* (2013.01); *F05D 2240/124* (2013.01); *F05D 2240/80* (2013.01); *F05D 2250/712* (2013.01); *F05D 2250/90* (2013.01); *Y02T 50/60* (2013.01)

(58) Field of Classification Search
CPC ...... F01D 25/246; F02C 3/04; F05D 2220/32; F05D 2240/124; F05D 2240/80; F05D 2250/712; F05D 2250/90; Y02T 50/673
USPC .......................................................... 60/805
See application file for complete search history.

(56) References Cited

U.S. PATENT DOCUMENTS

| | | | |
|---|---|---|---|
| 6,663,346 B2 | 12/2003 | Munsell et al. | |
| 6,669,445 B2 | 12/2003 | Staubach et al. | |
| 6,990,798 B2 | 1/2006 | Bouchard et al. | |
| 7,465,155 B2 | 12/2008 | Nguyen | |
| 7,887,297 B2 | 2/2011 | Allen-Bradley et al. | |
| 8,192,153 B2 | 6/2012 | Harvey et al. | |
| 8,206,115 B2 | 6/2012 | Gupta et al. | |
| 8,424,279 B2 | 4/2013 | Rajamani et al. | |
| 8,511,978 B2 | 8/2013 | Allen-Bradley et al. | |
| 2002/0127108 A1 | 9/2002 | Crall et al. | |
| 2003/0170124 A1* | 9/2003 | Staubach | F01D 5/142 416/193 A |
| 2008/0085190 A1 | 4/2008 | Liang | |
| 2008/0232968 A1 | 9/2008 | Nguyen | |
| 2010/0166558 A1 | 7/2010 | Siden et al. | |
| 2012/0051894 A1 | 3/2012 | Clements et al. | |
| 2012/0219401 A1 | 8/2012 | Rawlinson et al. | |
| 2012/0251291 A1 | 10/2012 | Ledezma et al. | |
| 2013/0000322 A1 | 1/2013 | Silkowski | |
| 2013/0108433 A1 | 5/2013 | Green et al. | |
| 2013/0164137 A1 | 6/2013 | Barnes et al. | |

OTHER PUBLICATIONS

International Search Report from corresponding PCT/US14/61449.
International Preliminary Report on Patentability for International Application No. PCT/US2014/061449 dated Jun. 2, 2016.

* cited by examiner

ENDWALL COUNTOURING TRENCH

CROSS-REFERENCE TO RELATED APPLICATION

This application claims priority to U.S. Provisional Application No. 61/907,420, filed Nov. 22, 2013.

BACKGROUND OF THE INVENTION

Higher efficiency turbomachinery designs utilize raised levels of flow loading in stationary blade rows. These elevated levels of loading can cause flow separations and pressure/performance losses. Typically, in a highly loaded configuration, near endwall flow rolls up onto an associated airfoil and causes trailing edge separation that can range between 10% to 30% of the radial span of the blade. This causes a downstream pressure loss, which degrades the overall efficiency of the turbomachinery stage and the effectiveness of highly loaded designs.

SUMMARY OF THE INVENTION

In a featured embodiment, a gas turbine engine component comprises a casing, and a component fixed to the casing to extend from a first edge to a second edge. The component has a first side and a second side. A trench is formed within the casing adjacent the second side of the component. The trench has a maximum depth that is positioned at or aft of the first edge.

In another embodiment according to the previous embodiment, the component comprises an airfoil fixed to the casing. The first edge is a leading edge and the second edge is a trailing edge. The first side is a pressure side and the second side is a suction side.

In another embodiment according to any of the previous embodiments, the trench is defined by a length extending in a longitudinal direction from the leading edge to the trailing edge and a width extending in a lateral direction from the airfoil toward an adjacent airfoil fixed to the casing.

In another embodiment according to any of the previous embodiments, the airfoil has a length extending from the leading edge to the trailing edge. The length of the trench is greater than the length of the airfoil.

In another embodiment according to any of the previous embodiments, a depth of the trench gradually decreases in an aft direction from the maximum depth and terminates at a location aft of the trailing edge of the airfoil.

In another embodiment according to any of the previous embodiments, a nominal flow path is defined by the casing. A depth of the trench gradually increases from the nominal flow path at a position forward of the leading edge to the maximum depth.

In another embodiment according to any of the previous embodiments, the width of the trench is less than a distance between the airfoil and the adjacent airfoil.

In another embodiment according to any of the previous embodiments, the airfoil has an airfoil length extending from the leading edge to the trailing edge. The maximum depth is located within a range of 4% to 10% of the airfoil length relative to the leading edge.

In another embodiment according to any of the previous embodiments, the airfoil has an aerodynamic loading factor that is greater than or equal to a value of 0.5.

In another embodiment according to any of the previous embodiments, the trench has a U-shaped cross-section in the direction extending from the leading edge to the trailing edge.

In another featured embodiment, a gas turbine engine component comprises a casing. A plurality of airfoils are fixed to the casing. Each airfoil defines an airfoil length that extends from a leading edge to a trailing edge. Each airfoil has a pressure side and a suction side. A trench is formed within the casing adjacent the suction side of at least one airfoil of the plurality of airfoils. The trench is defined by a length extending in a longitudinal direction from the leading edge to the trailing edge and a width extending in a lateral direction from the at least one airfoil toward an adjacent airfoil of the plurality of airfoils. The width of the trench is less than a distance between the at least one airfoil and the adjacent airfoil. The length of the trench is greater than the airfoil length.

In another embodiment according to the previous embodiment, the trench has a maximum depth that is positioned adjacent the leading edge.

In another embodiment according to any of the previous embodiments, the maximum depth is located within a range of 4% to 10% of the airfoil length relative to the leading edge.

In another embodiment according to any of the previous embodiments, a nominal flow path is defined by the casing. A depth of the trench gradually increases from the nominal flow path at a position forward of the leading edge to the maximum depth. The depth of the trench gradually decreases in an aft direction from the maximum depth and terminates at a location aft of the trailing edge of the airfoil.

In another embodiment according to any of the previous embodiments, the body has an aerodynamic loading factor that is greater than or equal to a value of 0.5.

In another featured embodiment, a gas turbine engine comprises a compressor section, a combustor section downstream of the compressor section, and a turbine section downstream of the combustor section. At least one of the combustor section and the turbine section include a component having an airfoil fixed to a casing to extend from a leading edge to a trailing edge. The airfoil has a pressure side and a suction side. A trench is formed within the casing adjacent the suction side of the airfoil, the trench having a maximum depth that is positioned adjacent the leading edge.

In another embodiment according to the previous embodiment, a nominal flow path is defined by the casing. A depth of the trench gradually increases from the nominal flow path at a position forward of the leading edge to the maximum depth. The depth of the trench gradually decreases in an aft direction from the maximum depth and terminates at a location aft of the trailing edge of the airfoil.

In another embodiment according to any of the previous embodiments, the airfoil has an airfoil length extending from the leading edge to the trailing edge. The maximum depth is located within a range of 4% to 10% of the airfoil length relative to the leading edge.

In another embodiment according to any of the previous embodiments, the trench is defined by a length extending in a longitudinal direction from the leading edge to the trailing edge and a width extending in a lateral direction. The width of the trench is less than a distance between the airfoil and an adjacent airfoil fixed to the casing. The length of the trench is greater than a length of the airfoil extending from the leading edge to the trailing edge.

In another embodiment according to any of the previous embodiments, the airfoil has an aerodynamic loading factor that is greater than or equal to a value of 0.5.

The foregoing features and elements may be combined in any combination without exclusivity, unless expressly indicated otherwise.

These and other features may be best understood from the following drawings and specification.

DETAILED DESCRIPTION

Figure 1A:
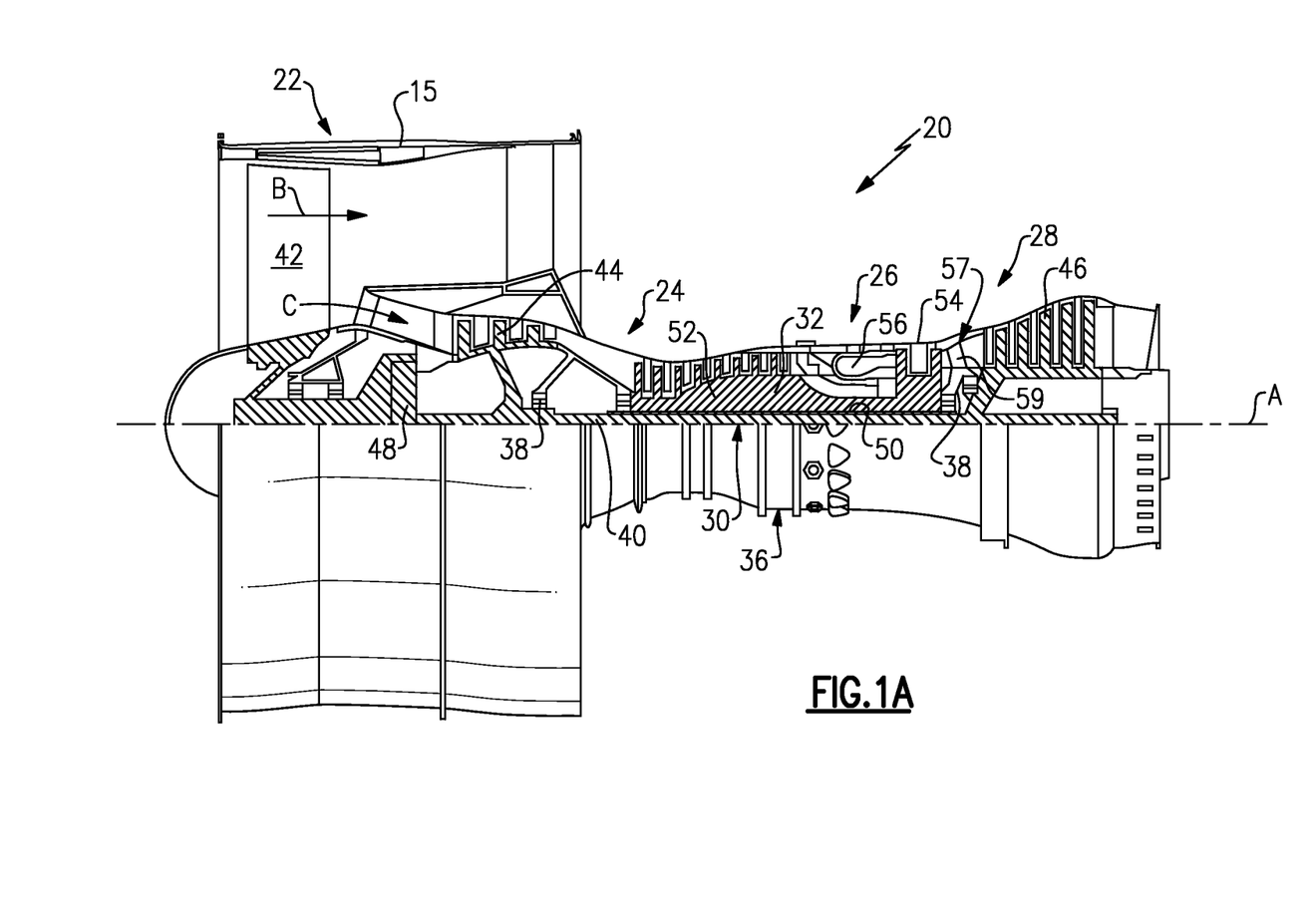
FIG. 1A is a schematic representation of one example of a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,°\, R)/(518.7° \, R)]^{0.5}$. The "Low corrected fan tip speed" as disclosed herein according to one non-limiting embodiment is less than about 1150 ft/second.

Figure 1B:
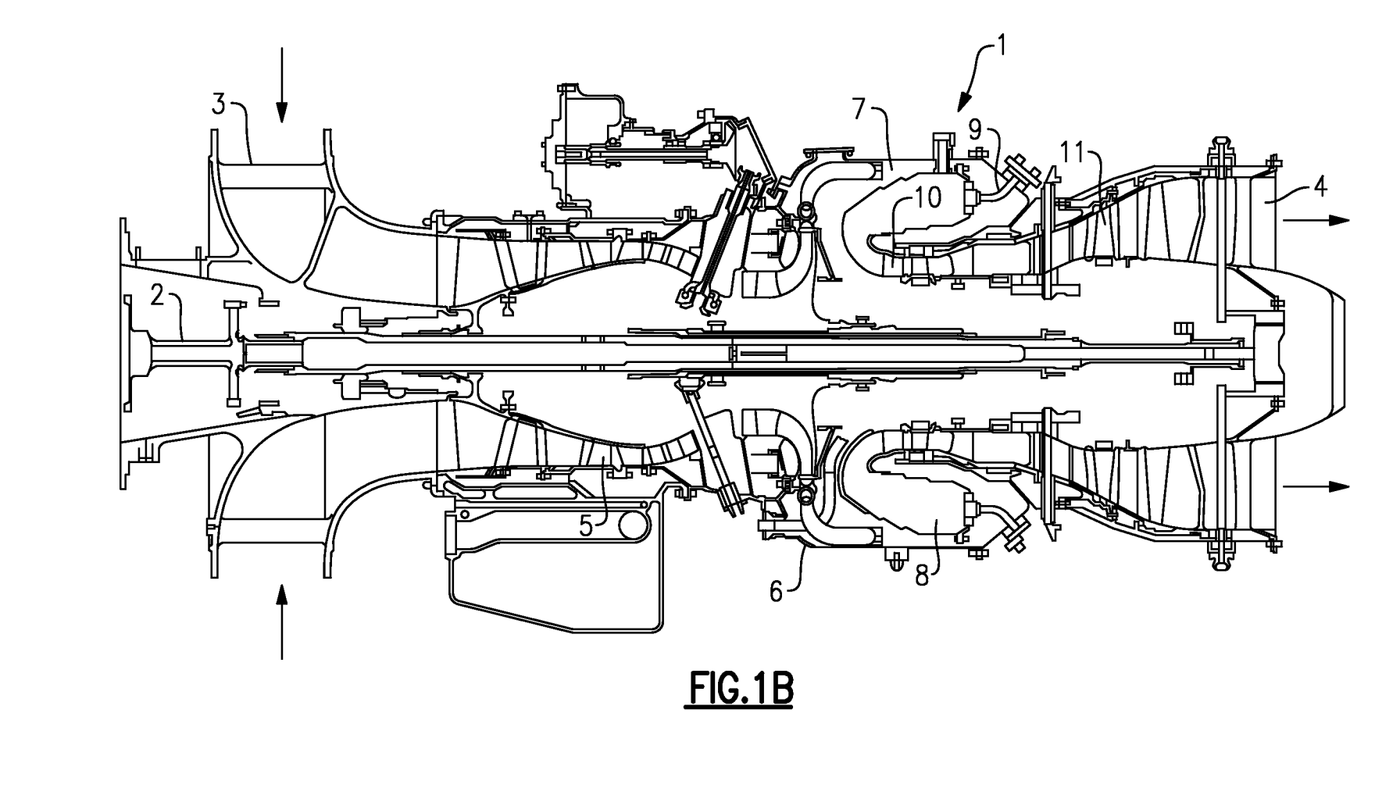
FIG. 1B is a schematic representation of another example of a gas turbine engine.

FIG. 1B shows an axial cross-section through a conventional turboshaft gas turbine engine 1 adapted for rotary wing aircraft to show the main components common to gas turbine engines, such as the configuration shown in FIG. 1A. Air intake into the engine 1 is diverted around the forwardly extending engine shaft 2 through the inlet duct 3 and is expelled through the exhaust outlet 4. In the turboshaft engine 1 of FIG. 1B, the inlet duct 3 draws in air radially through a 360 degree circumferentially open orifice that is usually fitted with a screen (not shown). The air then passes through a compressor section 5 having the low-pressure axial compressor and high-pressure centrifugal compressor. Compressed air exits the compressor section 5 through a diffuser 6 and is contained within a plenum 7 that surrounds a combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the combustor walls or is used for cooling to eventually mix with the hot gases from the combustor 8 and pass over the nozzle guide vane 10 to drive the turbine section 11 before exiting the tail of the engine 1 as exhaust.

It will be understood that the portions of the engine 1 shown in FIG. 1B that are downstream or aft of the air inlet duct 3 and forward of a reduction gear box are generally common to all gas turbine engines. Further, the invention is also applicable to any type of gas turbine engine with an inlet duct 3 and a forwardly projecting shaft or gearbox such as a turboprop for fixed wing aircraft, an auxiliary power unit, or stationary electric generator engine. The subject invention provides for improved flow and performance of aerodynamic components, such as airfoils for example. It should be understood that the teachings discussed below not only apply to the engine configurations discussed above, but also apply to other engine configurations. Other engine example configurations that could utilize the invention include, but are not limited to, rotorcraft engines, non-geared engines, three-spool configurations, augmented configurations, and configurations with a second bypass stream, etc.

Figure 2:
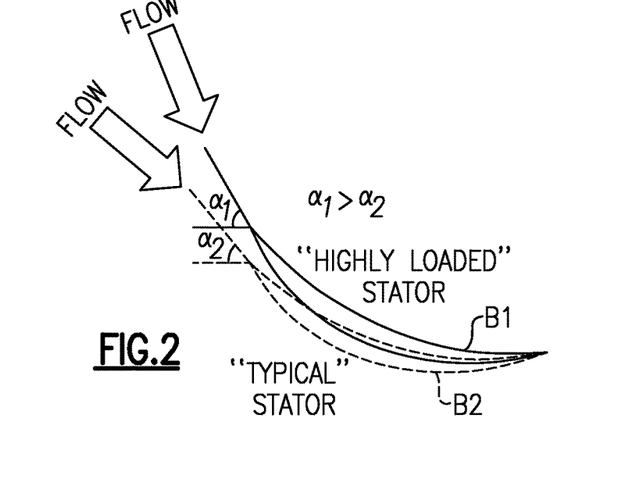
FIG. 2 is a top cross-sectional view of a traditional stator blade as compared to a highly loaded stator blade.

Stator vanes and rotor blades in the compressor section 24 and/or turbine section 28 define flow passages between adjacent blades and vanes. In higher efficiency turbomachinery designs, these structures can be subjected to higher aerodynamic loads than traditional configurations. FIG. 2 shows a comparison between a traditionally loaded stator blade B2 and a highly loaded stator blade B1. The traditional stator blade B2 is defined by a leading edge angle α2 and the highly loaded stator blade B1 is defined by a leading edge angle α1 that is greater than the leading edge angle α2 for the traditional stator blade B2. In this instance the higher aerodynamically loaded stator turns the air a greater amount across the length of the blade resulting in higher aerodynamic loading. It should be understood that stator loading can also be impacted by altering the inner and outer surface of the flow path.

Highly loaded stator blades B1 have a higher aerodynamic loading factor than the traditional stator blades B2. The aerodynamic loading factor is typically defined as $$\frac{\Delta P}{P_O - P} = \frac{P_{s_{exit}} - P_{s_{inlet}}}{P_{O_{exit}} - P_{s_{inlet}}}$$

where $Ps_{exit}$ is the static pressure at an exit of the blade row, $Ps_{inlet}$ is a static pressure at an inlet of the blade row, $Po_{exit}$ is a total pressure at the exit of the blade row, Po is a total pressure, ΔP is static pressure difference across the blade row, and P is the static pressure. Configurations that have a loading factor that is greater than or equal to a value of 0.5 are considered to be highly loaded stator blades.

Figure 3:
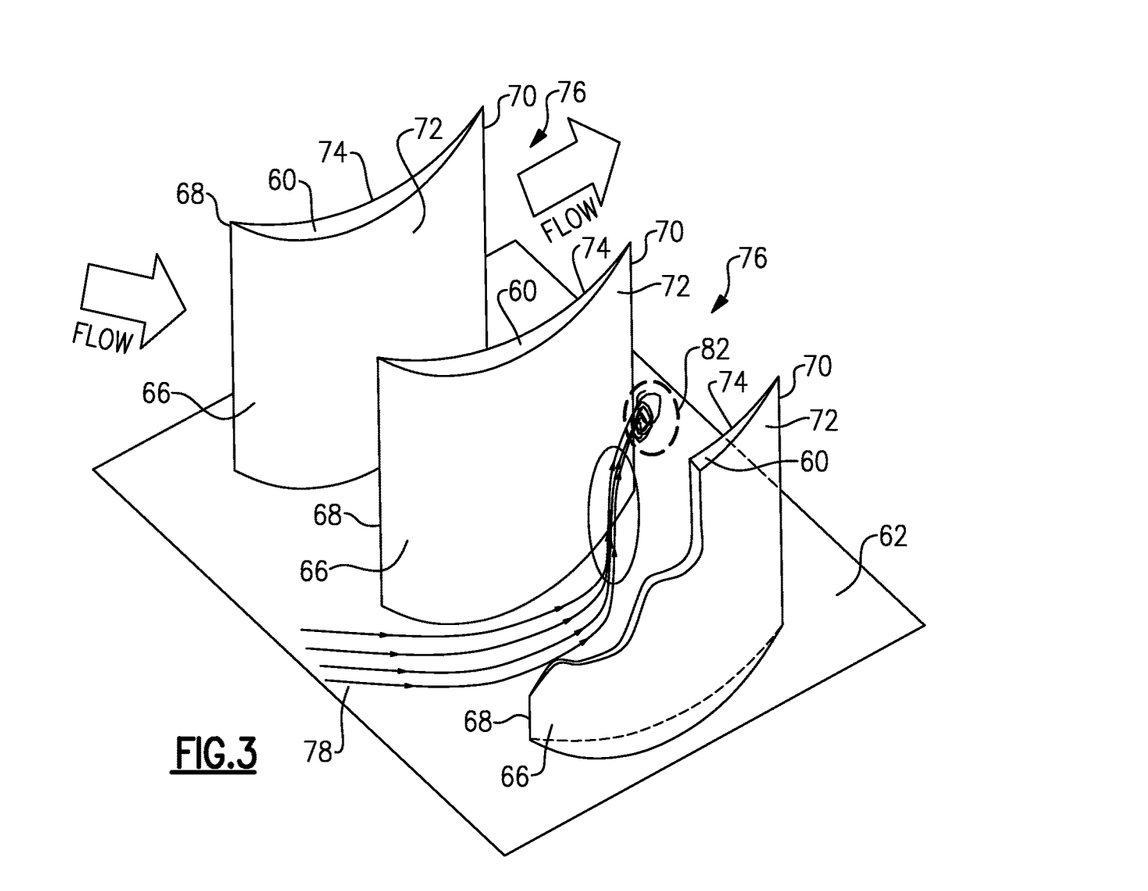
FIG. 3 is a perspective view of a stationary blade row showing endwall flow that rolls up and separates at a trailing edge of a blade.

FIG. 3 shows a series of highly loaded stator blades 60 that extend radially outwardly from a platform or an inner casing 62. Each blade has an airfoil section 66 with a leading edge 68, a trailing edge 70, a suction side wall 72, and a pressure side wall 74. As shown in FIG. 3, flow passages 76 are formed between adjacent blades 60. Near endwall flow 78 is driven onto the suction side wall 72 by the high pressure gradient in this highly loaded stator blade 60 and separates, i.e. rolls-up, at the trailing edge 70 as indicated at 82. The endwall roll-up flow can result in a trailing edge separation of between 10%-30% of a radial span of the airfoil section 66. This roll-up separation 82 causes a downstream pressure loss which degrades overall efficiency of the associated stage.

Figure 4:
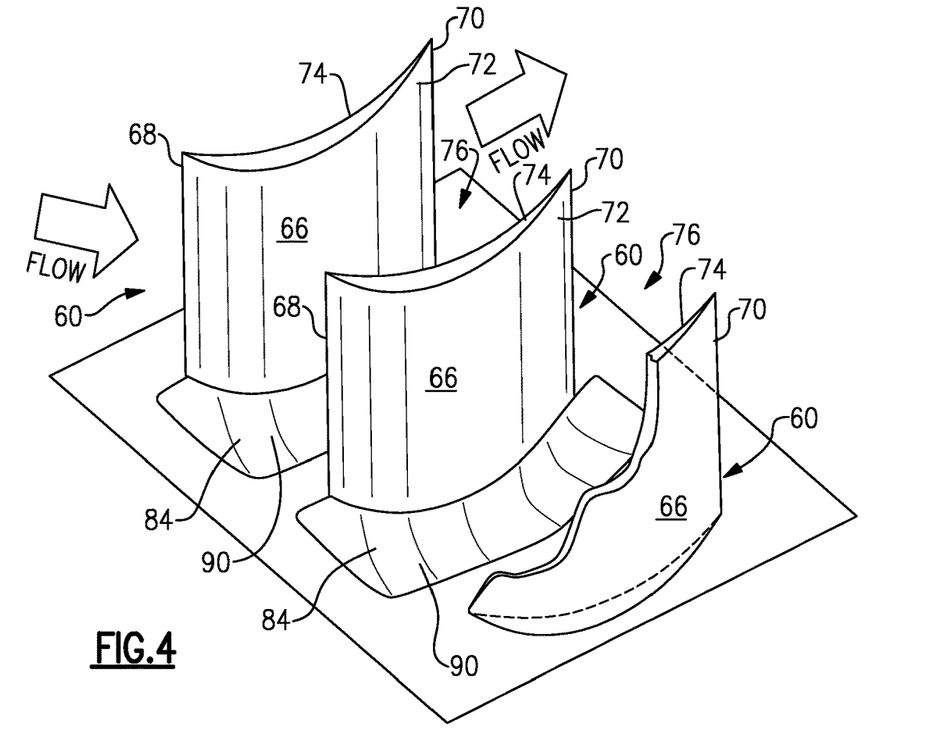
FIG. 4 is an isometric view of highly loaded stator blades incorporating a trench in the inner casing.
Figure 5A:
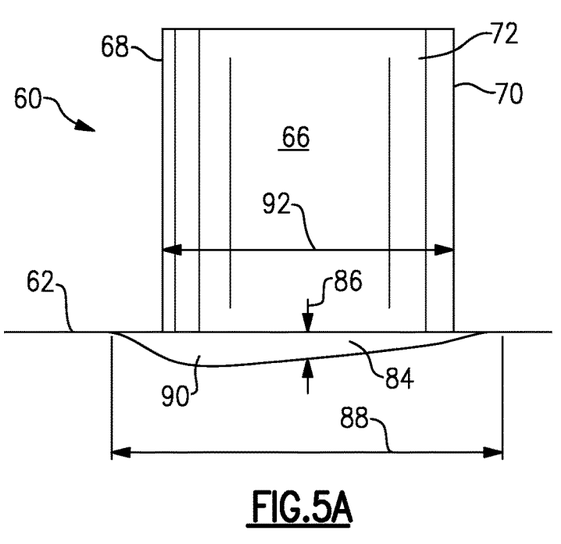
FIG. 5A is a cross-sectional view of a length of the trench of FIG. 4.
Figure 5B:
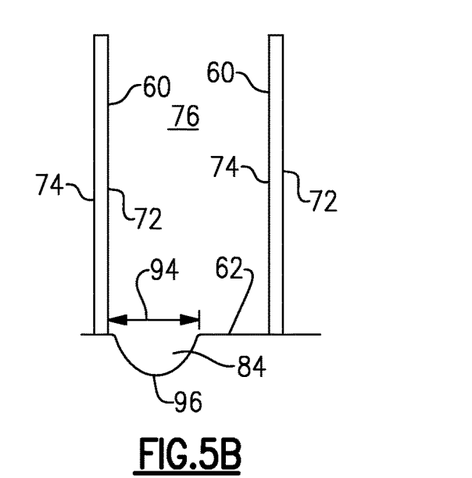
FIG. 5B is a cross-sectional view of a width of the trench of FIG. 4.
Figure 6:
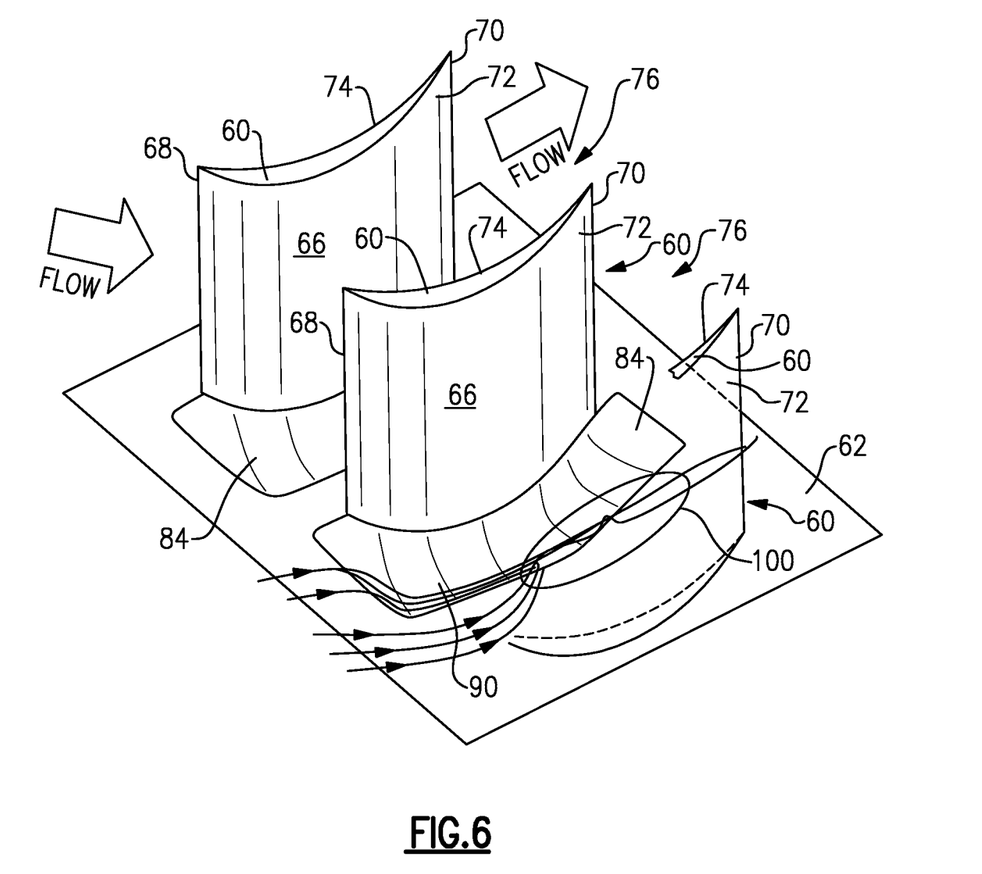
FIG. 6 is view similar to FIG. 4 but showing a non-axisymmetric flow path.

In order to eliminate or reduce this roll-up separation, a trench 84 is formed within the inner casing 62 as shown in FIGS. 4-6. Optionally, the trench could be formed within an outer casing. The trench 84 comprises a non-axisymmetric endwall contouring trench that is formed along the suction side 72 of the blades 60. In other words, the contour of the trench is not symmetrical about an axis extending along a center of the airfoil passage. The trench 84 runs the length of the blade and extends beyond both the leading edge 68 and trailing edge 70.

A depth 86 of the trench 84 varies as a function of a length 88 of the trench 84. The deepest portion 90 of the trench 84 is positioned at or aft of the leading edge 68. In one example, the deepest portion 90 is positioned within 4%-10% of the axial length of the blade 92. The trench 84 increases in depth from the nominal flow path at a location that is forward of the leading edge 68 to the deepest portion 90 just aft of the leading edge 68. The aft direction is a direction that moves from the leading edge 68 toward the trailing edge 70. The trench 84 gradually decreases in depth from the deepest portion 90 toward the trailing edge 70. The trench 84 terminates, i.e. flow returns to the nominal flow path, downstream of the trailing edge 70 as shown in FIG. 5A.

The trench 84 has a width 94 that extends from the suction side 72 of the blade 60 and terminates prior to reaching a pressure side 74 of an adjacent blade 60. Thus, the trench 84 does not completely span the distance between adjacent blades 60 (FIG. 5B). In one example, the width 94 of the trench 84 extends from the suction side 72 and terminates at an opposite edge located at a distance that is approximately half-way between adjacent blades 60.

In the example shown in FIG. 5B, the trench 84 has a generally U-shaped cross-section in the direction extending from the leading edge 68 to the trailing edge 70. An apex 96 is generally centrally located along a center location of the width 94 of the trench 84. In the example shown, the width 94 of the trench 84 is greater at the leading edge 68 than at the trailing edge 70.

Fluid flow within the trench 84 interacts with the near endwall cross-flow which prevents or blocks the near endwall flow from rolling up the airfoil 66 and separating the flow as shown at 100 in FIG. 6.

The disclosed embodiments show trenches formed within an inner casing; however, the trench could also be a designed feature that is used in the endwall geometry for an outer casing of a stationary turbomachine blade row. Further, the trench could also be used in endwall geometries for other components, such as vanes or blade outer air seals (BOAS) for example.

The utilization of highly loaded stators enables the incorporation of more efficient turbomachine blade designs; however, high loss in the stators due to trailing edge separations (FIG. 3) mitigate the performance improvement. The incorporation of the non-axisymmetric endwall trench 84 improves the flow through the highly loaded stator by eliminating trailing edge separation. This is accomplished by impeding the endwall roll-up flow onto the blade surface.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
a casing;
an airfoil fixed to the casing to extend from a leading edge to a trailing edge, the airfoil having a pressure side and a suction side; and
a trench formed within the casing adjacent the suction side of the component, the trench having a maximum depth that is positioned at or aft of the leading edge; and
wherein the trench is defined by a length extending in a longitudinal direction from the leading edge to the trailing edge and a width extending in a lateral direction from the airfoil toward an adjacent airfoil fixed to the casing, and wherein the width of the trench is less than a distance between the airfoil and the adjacent airfoil.

2. The gas turbine engine component according to claim 1 wherein the airfoil has a length extending from the leading edge to the trailing edge, and wherein the length of the trench is greater than the length of the airfoil.

3. The gas turbine engine component according to claim 1 wherein a depth of the trench gradually decreases in an aft direction from the maximum depth and terminates at a location aft of the trailing edge of the airfoil.

4. The gas turbine engine component according to claim 1 wherein a nominal flow path is defined by the casing, and wherein a depth of the trench gradually increases from the nominal flow path at a position forward of the leading edge to the maximum depth.

5. The gas turbine engine component according to claim 1 wherein the airfoil has an airfoil length extending from the leading edge to the trailing edge, and wherein the maximum depth is located within a range of 4% to 10% of the airfoil length relative to the leading edge.

6. The gas turbine engine component according to claim 1 wherein the airfoil has an aerodynamic loading factor that is greater than or equal to a value of 0.5.

7. The gas turbine engine component according to claim 1 wherein the trench has a U-shaped cross-section in the direction extending from the leading edge to the trailing edge.

8. The gas turbine engine component according to claim 1 wherein a lateral edge of the trench is laterally spaced apart from a pressure side of the adjacent airfoil.

9. The gas turbine engine component according to claim 1 wherein the width of the trench terminates prior to reaching the pressure side of the adjacent airfoil at a distance that is half-way between the at least one airfoil and the adjacent airfoil.

10. A gas turbine engine component comprising:
a casing;
a plurality of airfoils fixed to the casing, each airfoil defining an airfoil length that extends from a leading edge to a trailing edge, and each airfoil having a pressure side and a suction side; and
a trench formed within the casing adjacent the suction side of at least one airfoil of the plurality of airfoils, the trench defined by a length extending in a longitudinal direction from the leading edge to the trailing edge and a width extending in a lateral direction from the at least one airfoil toward an adjacent airfoil of the plurality of airfoils, and wherein the width of the trench is less than a distance between the at least one airfoil and the adjacent airfoil, and wherein the length of the trench is greater than the airfoil length.

11. The gas turbine engine component according to claim 10 wherein the trench has a maximum depth that is positioned adjacent the leading edge.

12. The gas turbine engine component according to claim 11 wherein the maximum depth is located within a range of 4% to 10% of the airfoil length relative to the leading edge.

13. The gas turbine engine component according to claim 11 wherein a nominal flow path is defined by the casing, and wherein a depth of the trench gradually increases from the nominal flow path at a position forward of the leading edge to the maximum depth, and wherein the depth of the trench gradually decreases in an aft direction from the maximum depth and terminates at a location aft of the trailing edge of the airfoil.

14. The gas turbine engine component according to claim 10 wherein each airfoil has an aerodynamic loading factor that is greater than or equal to a value of 0.5.

15. The gas turbine engine component according to claim 10 wherein the width of the trench terminates prior to reaching the pressure side of the adjacent airfoil at a distance that is half-way between the at least one airfoil and the adjacent airfoil.

16. A gas turbine engine comprising:
a compressor section;
a combustor section downstream of the compressor section; and
a turbine section downstream of the combustor section, and wherein at least one of the combustor section and the turbine section include a component having an airfoil fixed to a casing to extend from a leading edge to a trailing edge, the airfoil having a pressure side and a suction side, and a trench formed within the casing adjacent the suction side of the airfoil, the trench having a maximum depth that is positioned adjacent the leading edge, and wherein the trench is defined by a length extending in a longitudinal direction from the leading edge to the trailing edge and a width extending in a lateral direction from the airfoil toward an adjacent airfoil fixed to the casing, and wherein the width of the trench is less than a distance between the airfoil and the adjacent airfoil.

17. The gas turbine engine according to claim 16 wherein a nominal flow path is defined by the casing, and wherein a depth of the trench gradually increases from the nominal flow path at a position forward of the leading edge to the maximum depth, and wherein the depth of the trench gradually decreases in an aft direction from the maximum depth and terminates at a location aft of the trailing edge of the airfoil.

18. The gas turbine engine according to claim 17 wherein the airfoil has an airfoil length extending from the leading edge to the trailing edge, and wherein the maximum depth is located within a range of 4% to 10% of the airfoil length relative to the leading edge.

19. The gas turbine engine according to claim 16 wherein the length of the trench is greater than a length of the airfoil extending from the leading edge to the trailing edge.

20. The gas turbine engine according to claim 16 wherein the airfoil has an aerodynamic loading factor that is greater than or equal to a value of 0.5.

21. The gas turbine engine according to claim 16 wherein the width of the trench terminates prior to reaching the pressure side of the adjacent airfoil at a distance that is half-way between the at least one airfoil and the adjacent airfoil.

\* \* \* \* \*